(12) United States Patent
Chiu et al.

(10) Patent No.: US 12,292,293 B2
(45) Date of Patent: May 6, 2025

(54) MAGNET-GUIDING SWITCHING SYSTEM AND MAGNET-GUIDING SWITCHING METHOD

(71) Applicant: Automotive Research & Testing Center, Changhua County (TW)

(72) Inventors: Hsien-Chang Chiu, Changhua County (TW); Cheng-Hsien Wang, Changhua County (TW)

(73) Assignee: Automotive Research & Testing Center, Changhua County (TW)

( * ) Notice: Subject to any disclaimer, the term of this patent is extended or adjusted under 35 U.S.C. 154(b) by 248 days.

(21) Appl. No.: 18/059,988

(22) Filed: Nov. 30, 2022

(65) Prior Publication Data

US 2024/0175690 A1 May 30, 2024

(51) Int. Cl.
*G01C 21/34* (2006.01)
*H01F 7/06* (2006.01)
*H01F 7/20* (2006.01)

(52) U.S. Cl.
CPC .......... *G01C 21/34* (2013.01); *H01F 7/064* (2013.01); *H01F 7/20* (2013.01)

(58) Field of Classification Search
CPC . G01C 21/34; H01F 7/064; H01F 7/20; B60L 13/003; B60L 15/20; B60L 13/06; B60L 2200/26; B60W 30/18; B60W 30/12; G08G 1/042; G08G 1/056; G08G 1/097; B61B 13/08; B61B 13/04; B61B 10/001; E01B 25/12; B61L 15/0058; B61L 2205/04; B61L 23/042; G05D 1/0259–0263; G05D 1/0234; G05D 1/244; G05D 1/2446; G05D 1/247; G05D 1/646; E01F 11/00; E01F 9/506–524; G06V 20/588; G06V 180/168

USPC ........................................................ 701/410
See application file for complete search history.

(56) References Cited

U.S. PATENT DOCUMENTS

| 3,874,299 | A * | 4/1975 | Silva ...................... | B60L 13/003 104/130.02 |
| 9,475,511 | B2 * | 10/2016 | Tippey ................... | B61L 25/025 |
| 2007/0044676 | A1 * | 3/2007 | Clark ...................... | B61B 13/08 104/130.02 |
| 2021/0263527 | A1 * | 8/2021 | Yazhemsky ............ | G05B 15/02 |

(Continued)

FOREIGN PATENT DOCUMENTS

CN         118159925 A  *  6/2024   ............. G05D 1/244

*Primary Examiner* — Fadey S. Jabr
*Assistant Examiner* — Paula L Schneider
(74) *Attorney, Agent, or Firm* — CKC & Partners Co., LLC

(57) ABSTRACT

A magnet-guiding switching system includes a lane magnetic field device, a switching controlling module and a route controlling center. As the switching controlling unit informs the magnetic field switching unit to turn on the first switching electromagnets and to turn off the second switching electromagnets according to the driving signal, the vehicle is guided by magnetic fields of the first switching electromagnets to drive from the first section of the first route to the second section along the guiding section; as the switching controlling unit informs the magnetic field switching unit to turn on the second switching electromagnets and to turn off the first switching electromagnets according to the driving signal, the vehicle is guided by magnetic fields of the second switching electromagnets to drive from the first section of the first route to the continuous section of the second route along the switching section.

9 Claims, 6 Drawing Sheets

(56) References Cited

U.S. PATENT DOCUMENTS

2021/0340715 A1\* 11/2021 Yamamoto .............. E01F 11/00
2022/0041193 A1\* 2/2022 Ganesan ................... B61L 3/10

\* cited by examiner

MAGNET-GUIDING SWITCHING SYSTEM AND MAGNET-GUIDING SWITCHING METHOD

BACKGROUND

Technical Field

The present disclosure relates to a switching system and a switching method. More particularly, the present disclosure relates to a magnet-guiding switching system and a magnet-guiding switching method adapting the magnetic field.

Description of Related Art

Automatous driving vehicles are developed owing to the improvement of the technique. The automatous driving vehicles generally employ a real time kinematic (RTK) positioning technique, which uses the differential between the dynamic positioning information based on global navigation satellite system (GNSS) and the observed information of a ground base station to obtain accurate positioning. Moreover, the automatous driving vehicles can employ a plurality of sensors and cameras to detect the environment, such as using simultaneous localization and mapping (SLAM) technique to detect the environment and conduct self-positioning. However, no matter what kind of positioning method is used, unstable positioning easily occurs, and track errors exist owing to the intervened accuracy.

Another kind of automatous driving vehicle, magnet-guiding vehicles, can be guided by the magnets, the magnets can be disposed on the ground or below the ground, and the automatous driving vehicles can drive along the route according to the detected magnetic fields. Therefore, this kind of automatous driving vehicle has high stability and high accuracy, and can be applied to the situation that needs high positioning accuracy, for example, the situation that the vehicle stops at stations or the situation that the turning angle is calibrated. However, this kind of automatous driving vehicle has to be guided by the magnets disposed on the ground or below the ground, the flexibility of the route is low, and there are problems to be solved.

SUMMARY

According to one aspect of the present disclosure, a magnet-guiding switching system includes a lane magnetic field device, a switching controlling module and a route controlling center. The lane magnetic field device includes a plurality of first permanent magnet, a plurality of second permanent magnets, a plurality of first switching electromagnets and a plurality of second switching electromagnets. The first permanent magnets are arranged at a first section and a second section of a first route in intervals. The first route further includes a guiding section located between the first section and the second section. The second permanent magnets are arranged at a continuous section of a second route in intervals. The second route further includes a switching section connected to the continuous section of the second route and the first section of the first route, and the continuous section of the second route and the second section of the first route are not coaxial. The first switching electromagnets are arranged at the guiding section in intervals. The second switching electromagnets are arranged at the switching section in intervals. The switching controlling module includes a magnetic field switching unit and a switching controlling unit. The magnetic field switching unit is electrically connected to the first switching electromagnets and the second switching electromagnets, and the magnetic field switching unit is configured to turn on or turn off the first switching electromagnets and the second switching electromagnets. The switching controlling unit is signally connected to the magnetic field switching unit to send a switching controlling signal to the magnetic field switching unit. The route controlling center is communicatively connected to the switching controlling unit, and the route controlling center is configured to plan a driving route of a vehicle and to send a driving signal to the switching controlling unit. As the switching controlling unit informs the magnetic field switching unit to turn on the first switching electromagnets and to turn off the second switching electromagnets according to the driving signal, the vehicle is guided by magnetic fields of the first switching electromagnets to drive from the first section of the first route to the second section along the guiding section; as the switching controlling unit informs the magnetic field switching unit to turn on the second switching electromagnets and to turn off the first switching electromagnets according to the driving signal, the vehicle is guided by magnetic fields of the second switching electromagnets to drive from the first section of the first route to the continuous section of the second route along the switching section.

According to another aspect of the present disclosure, the magnet-guiding switching method includes a route planning step, a switching controlling step and a guiding step. In the route planning step, a route controlling center plans a driving route of a vehicle according to an environment situation and sends a driving signal to a switching controlling unit of a switching controlling module. In the switching controlling step, the switching controlling unit informs a magnetic field switching unit of the switching controlling module to turn on a plurality of first switching electromagnets at a first route and to turn off a plurality of second switching electromagnets at a second route, or to turn on the second switching electromagnets and to turn off the first switching electromagnets. In the guiding step, the vehicle is guided by magnetic fields of the first switching electromagnets that are turned on or magnetic fields of the second switching electromagnets that are turned on to decide to continuously drive on the first route or to switch to the second route.

BRIEF DESCRIPTION OF THE DRAWINGS

The disclosure can be more fully understood by reading the following detailed description of the embodiments, with reference made to the accompanying drawings as follows.

DETAILED DESCRIPTION

It will be understood that when an element (or mechanism or module) is referred to as being "disposed on", "connected to" or "coupled to" another element, it can be directly disposed on, connected or coupled to another element, or it can be indirectly disposed on, connected or coupled to another element, that is, intervening elements may be present. In contrast, when an element is referred to as being "directly disposed on", "directly connected to" or "directly coupled to" another element, there are no intervening elements present.

In addition, the terms first, second, third, etc. are used herein to describe various elements or components, these elements or components should not be limited by these terms. Consequently, a first element or component discussed below could be termed a second element or component. Moreover, the combinations of the elements, the components, the mechanisms and the modules are not well-known, ordinary or conventional combinations, and whether the combinations can be easily completed by the one skilled in the art cannot be judged based on whether the elements, the components, the mechanisms or the module themselves are well-known, ordinary or conventional.

Figure 1:
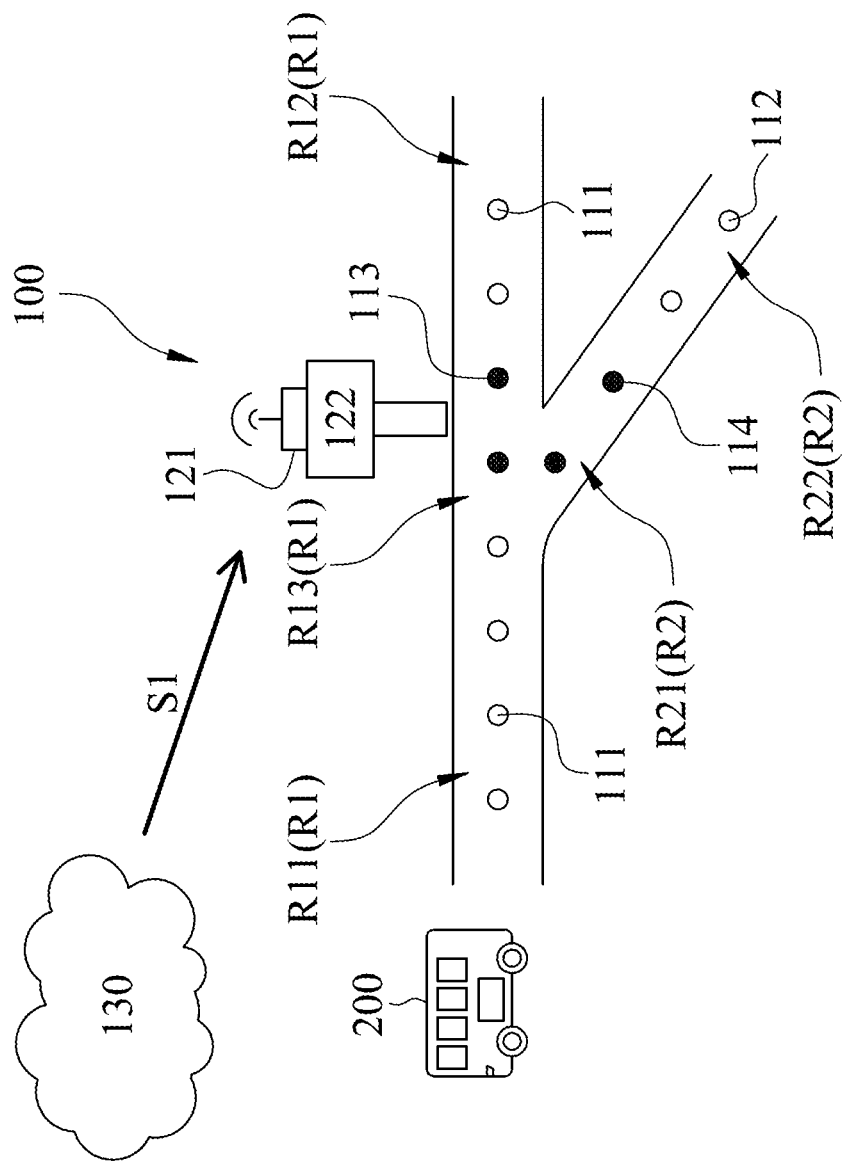
FIG. 1 shows a schematic view of a magnet-guiding switching system of a first embodiment of the present disclosure applied for a vehicle to drive on a first route or a second route.
Figure 2:
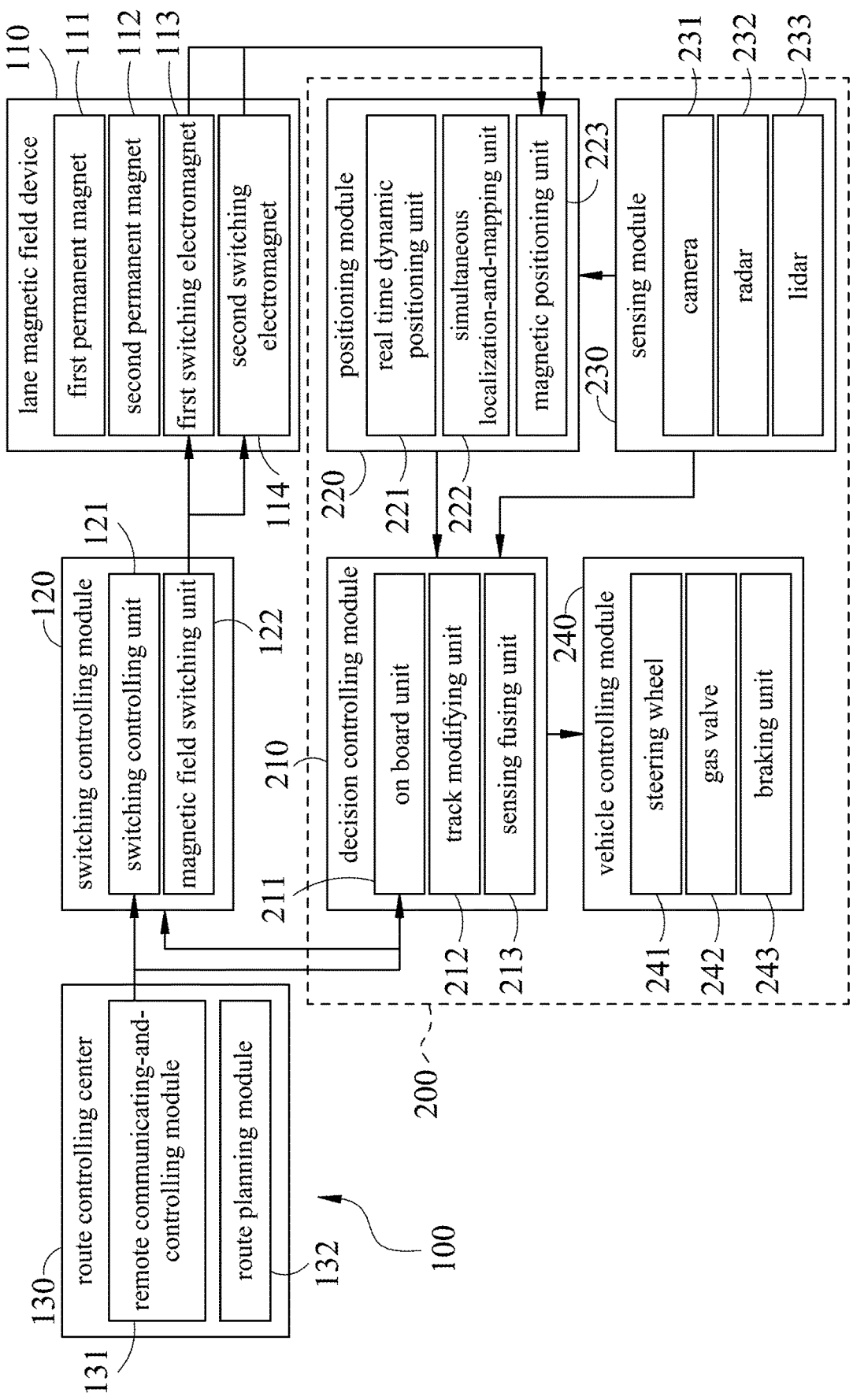
FIG. 2 shows a block diagram of the magnet-guiding switching system of the first embodiment of FIG. 1 and the vehicle.

FIG. 1 shows a schematic view of a magnet-guiding switching system 100 of a first embodiment of the present disclosure applied for a vehicle 200 to drive on a first route R1 or a second route R2. FIG. 2 shows a block diagram of the magnet-guiding switching system 100 of the first embodiment of FIG. 1 and the vehicle 200. A magnet-guiding switching system 100 includes a lane magnetic field device 110, a switching controlling module 120 and a route controlling center 130. The lane magnetic field device 110 includes a plurality of first permanent magnets 111, a plurality of second permanent magnets 112, a plurality of first switching electromagnets 113 and a plurality of second switching electromagnets 114. The first permanent magnets 111 are arranged at a first section R11 and a second section R12 of a first route R1 in intervals. The first route R1 further includes a guiding section R13 located between the first section R11 and the second section R12. The second permanent magnets 112 are arranged at a continuous section R22 of a second route R2 in intervals. The second route R2 further includes a switching section R21 connected to the continuous section R22 of the second route R2 and the first section R11 of the first route R1, and the continuous section R22 of the second route R2 and the second section R12 of the first route R1 are not coaxial. The first switching electromagnets 113 are arranged at the guiding section R13 in intervals. The second switching electromagnets 114 are arranged at the switching section R21 in intervals.

The switching controlling module 120 includes a magnetic field switching unit 122 and a switching controlling unit 121. The magnetic field switching unit 122 is electrically connected to the first switching electromagnets 113 and the second switching electromagnets 114, and the magnetic field switching unit 122 is configured to turn on or turn off the first switching electromagnets 113 and the second switching electromagnets 114. The switching controlling unit 121 is signally connected to the magnetic field switching unit 122 to send a switching controlling signal to the magnetic field switching unit 122. The route controlling center 130 is communicatively connected to the switching controlling unit 121, and the route controlling center 130 is configured to plan a driving route of a vehicle 200 and to send a driving signal S1 to the switching controlling unit 121. As the switching controlling unit 121 informs the magnetic field switching unit 122 to turn on the first switching electromagnets 113 and to turn off the second switching electromagnets 114 according to the driving signal S1, the vehicle 200 is guided by magnetic fields of the first switching electromagnets 113 to drive from the first section R11 of the first route R1 to the second section R12 along the guiding section R13; as the switching controlling unit 121 informs the magnetic field switching unit 122 to turn on the second switching electromagnets 114 and to turn off the first switching electromagnets 113 according to the driving signal S1, the vehicle 200 is guided by magnetic fields of the second switching electromagnets 114 to drive from the first section R11 of the first route R1 to the continuous section R22 of the second route R2 along the switching section R21.

Therefore, through the guidance of the first switching electromagnets 113 or the second switching electromagnets 114, the vehicle 200 can change route according to the plan, thereby increasing the flexibility of changing route of the vehicle 200. Details of the magnet-guiding switching system 100 will be described hereinafter.

As shown in FIG. 1, the first route R1 is a straight route, and the second route R2 is a turning route and connects the first route R1 to form a lane having an intersection. Precisely, as the vehicle 200 drives straight, the vehicle 200 can drive sequentially on the first section R11, the guiding section R13 and the second section R12; as the vehicle 200 turns, the vehicle 200 can drive on the first section R11 first, and then turns into the switching section R21 and drives on the continuous section R22. In a general situation, a vehicle will choose to go straight or turn in an intersection, and will go along the lane at non-intersection places. Hence, in the present disclosure, the electromagnets which can be turned on or turned off to control whether to generate the magnetic field can be disposed at the intersection, i.e., the guiding section and the switching section, and permanent magnets which cannot be turned off and can generate the magnetic field forever can be disposed at other non-intersection places. It should be known that the shape of the first route R1 and the second route R2 illustrated in FIG. 1 is only for illustration, and a number and rows of the first permanent magnets 111 and a number and rows of the second permanent magnets 112 can be configured based on real demands. The first permanent magnets 111 and the second permanent magnets 112 can be disposed under the ground or disposed above the road surface, and the present disclosure is not limited thereto. Each of the intervals between two of the first switching electromagnets 113 is larger than 50 cm and smaller than 120 cm. Each of the intervals between two of the second switching electromagnets 114 is also larger than 50 cm and smaller than 120 cm. If the interval is smaller than 50 cm, miss judgments may occur owing to the short distance; if the interval is too long, the magnetic fields may not be connected. In one embodiment, the interval that the first switching electromagnets and the second switching electromagnets arranged is 100 cm. In another embodiment, the magnetic fields of the first switching electromagnets and the second switching electromagnets can be adjusted by controlling the current, and the distribution thereof can be adjusted by the range of the magnetic field, and the present disclosure is not limited thereto.

As shown in FIG. 2, the route controlling center 130 may include a remote communicating-and-controlling module 131 and a route planning module 132. The remote communicating-and-controlling module 131 is configured to be communicated with the switching controlling unit 121. The route planning module 132 can plan the driving route of the vehicle 200 according to the road situation or demands. For example, if the vehicle 200 is a bus, and the second route R2 is a route that enters the bus station, as there is no passenger waiting in the bus station, there is no need for the bus to enter the station. Hence, the route planning module 132 of the route controlling center 130 can plan a driving route going straight, and informs the switching controlling module 120 to turn on the first switching electromagnets 113 and turn off the second switching electromagnets 114; as a result, the vehicle 200 can detect the magnetic fields of the first switching electromagnets 113 and drives straightly into the second section R12 along the guiding section R13. On the contrary, as there are passengers waiting in the bus station, the route planning module 132 of the route controlling center 130 can plan a driving route taking turns, and informs the switching controlling module 120 to turn off the first switching electromagnets 113 and turn on the second switching electromagnets 114; as a result, the vehicle 200 can detect the magnetic fields of the second switching electromagnets 114 and turns into the contiguous section R22 to enter the bus station along the switching section R21.

Moreover, the vehicle 200 may include a decision controlling module 210, and the decision controlling module 210 includes an on board unit 211 communicatively connected to the route controlling center 130 and the switching controlling unit 121. Precisely, the decision controlling module 210 may be communicatively connected to the remote communicating-and-controlling module 131, and thus the route controlling center 130 can use the remote communicating-and-controlling module 131 to inform the decision controlling module 210 the driving route, thereby allowing the vehicle 200 to conduct preparing. In addition, the on board unit 211 can confirm the informed driving route with the switching controlling unit 121 to make sure the identified driving route to be the same and to ensure the driving safety.

The vehicle 200 may include a magnetic positioning unit 223 configured to detect the magnetic fields of the first switching electromagnets 113 and the second switching electromagnets 114. In the first embodiment, the magnetic positioning unit 223 may include a plurality of magnetic navigation sensors, and the magnetic navigation sensors are disposed at different positions of the chassis of the vehicle 200 to detect the value of the magnet field. Therefore, the switching situations of the first switching electromagnets 113 and the second switching electromagnets 114 can be known according to the value of the magnet field detected by each of the magnetic navigation sensors. The decision controlling module 210 may further include a track modifying unit 212, and the track modifying unit 212 can modify a driving track of the vehicle 200 according to at least one parameter of the vehicle 200 and the magnetic fields detected by the magnetic positioning unit 223.

To be more specific, the parameter of the vehicle 200 may be the weight, the length, the wheel axle length, and the current speed. Since different vehicles 200 may have different turning radiuses, and the speed will affect the turning radius, the vehicle 200 may have a different driving track as having different parameters. The driving track may for example include a turning angle. In other words, as turning in the same road, the turning angle of a large car and the turning angle of a small car are different. Hence, the turning starting time of the large car and a small car are different. Therefore, as the magnetic positioning unit 223 of the vehicle 200 detects the magnetic fields of the second switching electromagnets 114, the magnetic positioning unit 223 can know the distances, the angles, etc., between the second switching electromagnets 114 and the magnetic navigation sensors itself according to the values of the magnetic fields detected by the magnetic navigation sensors. Consequently, the turning angle and the turning starting time can be decided according to the parameters of the vehicle 200, and the vehicle 200 can turn safely.

In the first embodiment, the vehicle 200 may further include a positioning module 220, a sensing module 230 and a vehicle controlling module 240. Except the on board unit 211 and the track modifying unit 212, the decision controlling module 210 may further include a sensing fusing unit 213 signally connected to the sensing module 230. The sensing module 230 may include a camera 231, a radar 232 and a lidar 233. Except the aforementioned magnetic positioning unit 223, the positioning module 220 may further include a real time dynamic positioning unit 221 configured to conduct a satellite positioning and a simultaneous localization-and-mapping unit 222 signally connected to the sensing module 230 and configured to receive detections of the sensing module 230 to conduct a positioning in a self-environment. The sensing fusing unit 213 can receive the information from the sensing module 230 to judge the road situation and the driving situation, such as speed, obstacles, etc. The vehicle controlling module 240 may include a steering wheel 241, a gas valve 242 and a braking unit 243. The decision controlling module 210 can control the operation of the vehicle controlling module 240 according to the command for the on board unit 211, e.g., the driving route from the route controlling center 130, the driving track of the track modifying unit 212 and the environment detection of the sensing fusing unit 213, such as rotate the steering wheel 241 to turn, to operate the gas valve 242 for acceleration, or to operate the braking unit 243 for deceleration.

Figure 3:
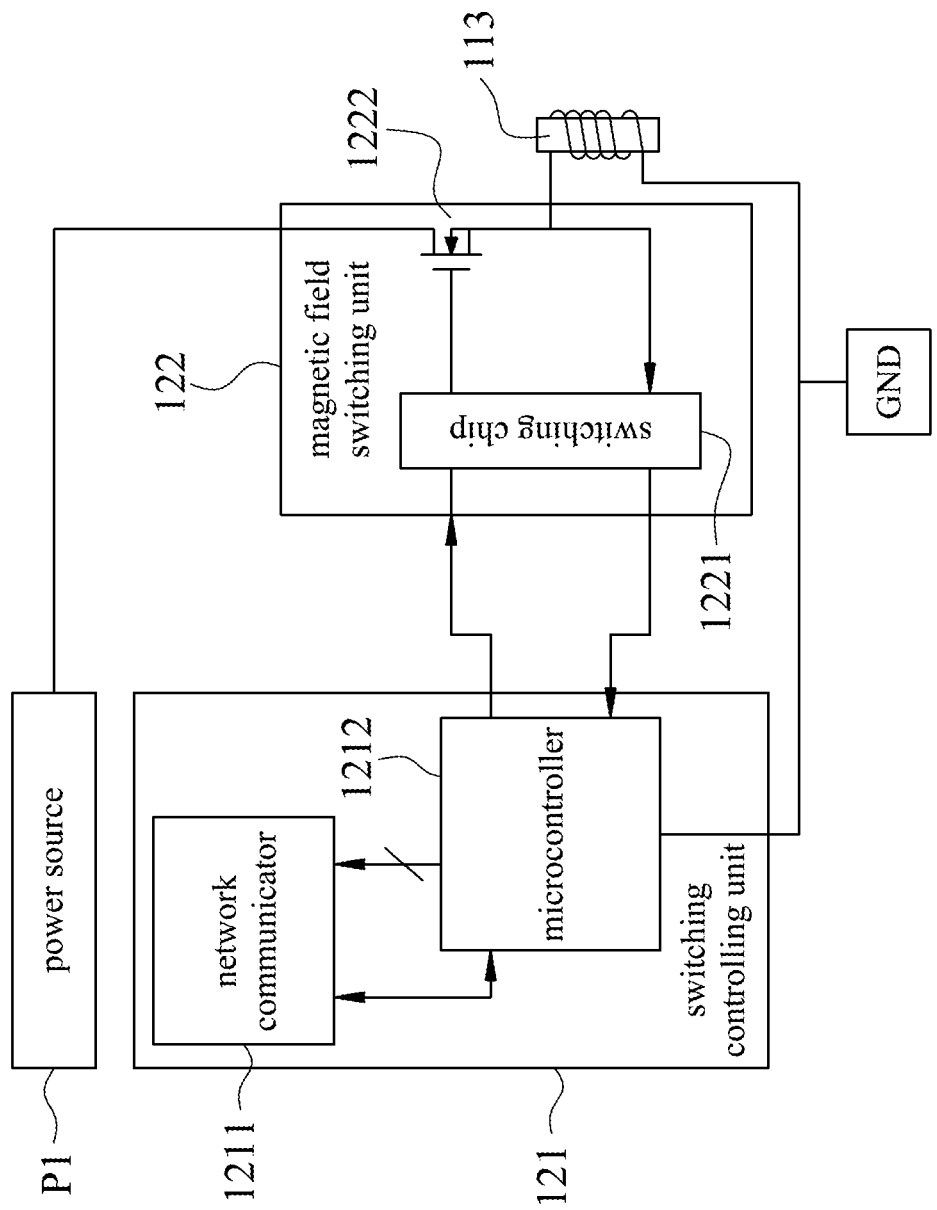
FIG. 3 shows a detail block diagram of a switching controlling module of the magnet-guiding switching system of the first embodiment of FIG. 1.

FIG. 3 shows a detail block diagram of a switching controlling module 120 of the magnet-guiding switching system 100 of the first embodiment of FIG. 1. Please refer to FIG. 3 with reference of FIG. 2. The switching controlling unit 121 may include a network communicator 1211 and a microcontroller 1212. The magnetic field switching unit 122 may include a switching chip 1221 and a transistor 1222, and the transistor 1222 is electrically connected to a power source P1 and the first switching electromagnets 113. The microcontroller 1212 may be electrically connected to the network communicator 1211 and the switching chip 1221, and the microcontroller 1212 and the first switching electromagnets 113 may be electrically connected to a ground GND.

The microcontroller 1212 may send the switching controlling signal to the switching chip 1221 to operate the magnetic field switching unit 122. If the magnetic field switching unit 122 operates normally, the pins of the switching chip 1221 will send the signals back to the microcontroller 1212, representing operating normally. On the contrary, if no signal is sent back from the switching chip 1221 to the pins after the switching controlling signal is sent to the switching chip 1221, the magnetic field switching unit 122 does not work normally. Hence, through the aforementioned mechanism, whether the command of the microcontroller 1212 is executed by the magnetic field switching unit 122 can be confirmed. In addition, after the microcontroller 1212 confirms whether the magnetic field switching unit 122 is normally operated after comparison, the comparing result will be sent to the network communicator 1211 via the information interface, and then be sent back to the route controlling center 130 via a wired network such as Ethernet or a wireless network such as Wi-Fi. It is known that although there is only one first switching electromagnet 113 and only one transistor 1222 illustrated in FIG. 3, each of the first switching electromagnets 113 can coordinate with one transistor 1222, and the same output pin of the switching chip 1221 can correspond to the first switching electromagnets 113 at the same section. The configuration of the controlling circuit of the second switching electromagnets 114 is similar, and will not be repeated.

Figure 4:
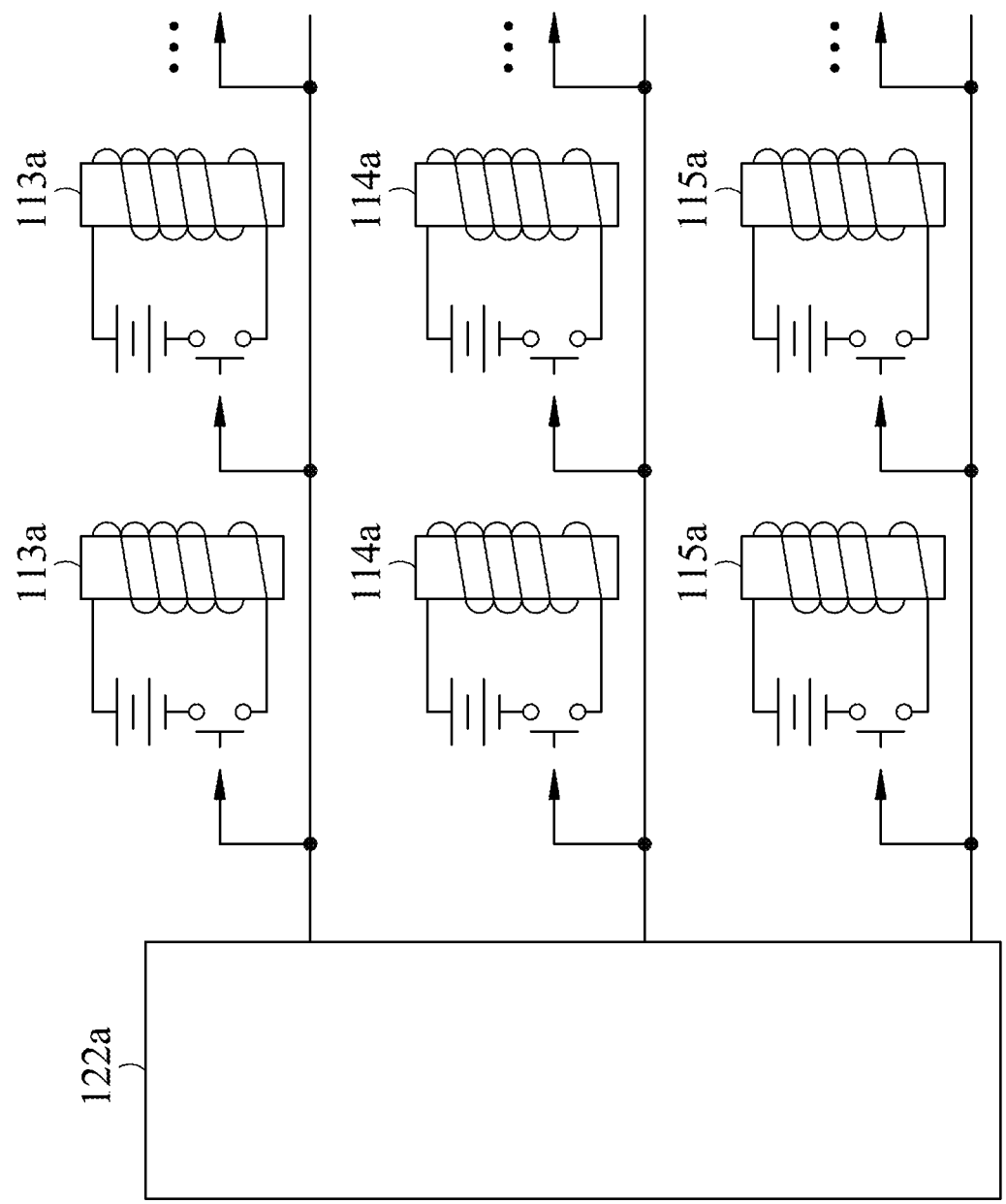
FIG. 4 shows a configuration of a magnetic field switching unit and switching electromagnets of a magnet-guiding switching system according to a second embodiment of the present disclosure.
Figure 5:
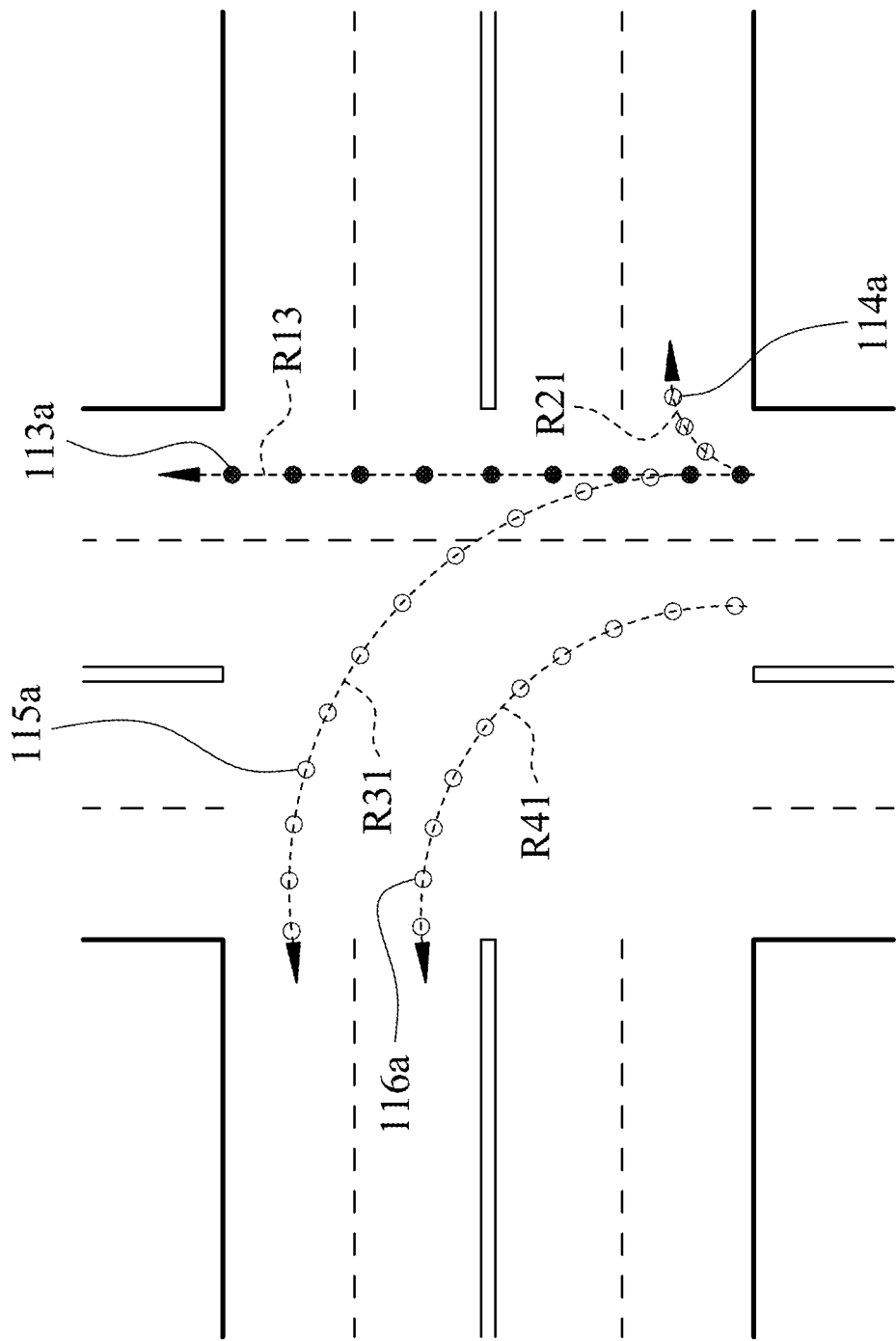
FIG. 5 shows a route configuration applying the magnet-guiding switching system of the second embodiment of FIG. 4.

FIG. 4 shows a configuration of a magnetic field switching unit 122a and switching electromagnets of a magnet-guiding switching system according to a second embodiment of the present disclosure. FIG. 5 shows a route configuration applying the magnet-guiding switching system of the second embodiment of FIG. 4. The magnet-guiding switching system (not labeled in the second embodiment) of FIG. 4 is similar to the magnet-guiding switching system 100 of the first embodiment. The difference is that the magnetic field switching unit 122a may be electrically connected to a plurality of first switching electromagnets 113a, a plurality of second switching electromagnets 114a, and a plurality of third switching electromagnets 115a.

As shown in FIG. 5, the intersection is large and includes two lanes. The intersection may be separated into a guiding section R13 which is for going straight, a switching section R21 which is for taking a right turn, and a switching section R31 which is for taking a left turn. The first switching electromagnets 113a can be arranged at the guiding section R13 in intervals, the second switching electromagnets 114a can be arranged at the switching section R21 in intervals, and the third switching electromagnets 115a can be arranged at the switching section R31 in intervals. Hence, with that the magnetic field switching unit 122a can choose to turn on the first switching electromagnets 113a, the second switching electromagnets 114a, or the third switching electromagnets 115a, the vehicle can be guided to go straight, take a right turn, or take a left turn. Moreover, the intersection can further include a switching section R41 which is for taking a left turn in an inner lane, and a guiding section (not illustrated in FIG. 5) for going straight in the inner lane. A plurality of fourth switching electromagnets 116a can be disposed at the switching section R41, and a plurality of fifth switching electromagnets can be disposed at the guiding section that is for going straight in the inner lane. The same switching chip of the magnetic field switching unit 122a can be electrically connected to the fourth switching electromagnets 116a and the fifth switching electromagnets, or different switching chip can be electrically connected to and control the fourth switching electromagnets 116a and the fifth switching electromagnets. The configurations of other lanes of other directions are similar, and will not be repeated.

Moreover, if a width of each lane is 5 m, the length of the guising section R13 is 20 m because the guiding section R13 crosses four lanes. Therefore, twenty first switching electromagnets 113a can be arranged thereat. For the switching sections R21, R31, R41 for taking a right turn or a left turn, the number of the switching electromagnets can be calculated by a center radius of curvature of the switching section. As r is used to represent the center radius of curvature, a number of the second switching electromagnets 114a, a number of the third switching electromagnets 115a and a number of the fourth switching electromagnets 116a can be equal to $\pi \cdot r/2$, where $\pi$ represents a ratio of a circumference of a circle. In FIG. 5, the center radius of curvature of the switching section R21 is 2.5 m (r=2.5), and the number of the second switching electromagnets 114a is 4. The center radius of curvature of the switching section R31 is 17.5 m (r=17.5), and the number of the third switching electromagnets 115a is 27. The center radius of curvature of the switching section R41 is 12.5 m (r=12.5), and the number of the fourth switching electromagnets 116a is 19.

Figure 6:
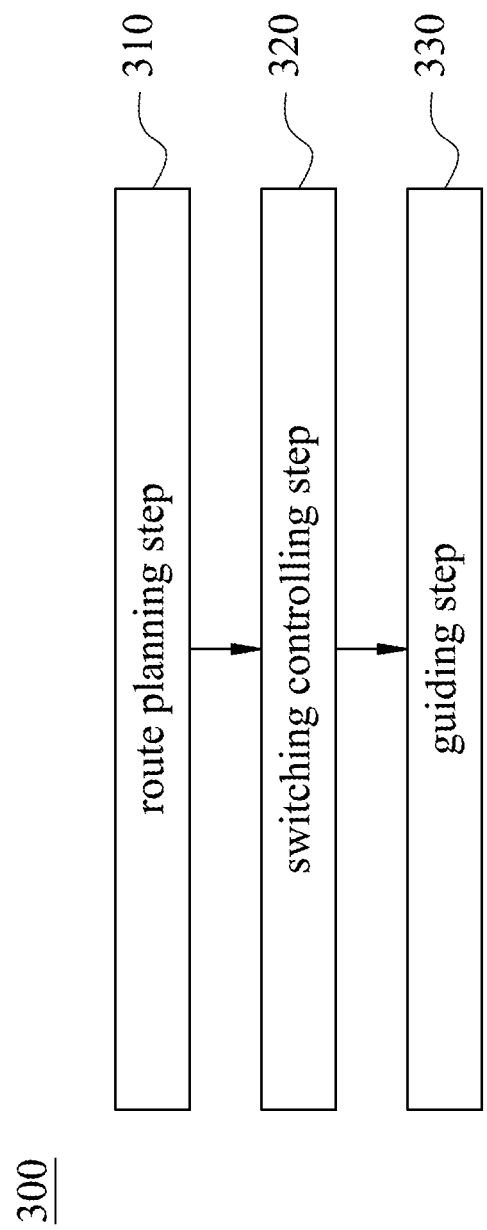
FIG. 6 shows a block flow chart of a magnet-guiding switching method according to a third embodiment of the present disclosure.

FIG. 6 shows a block flow chart of a magnet-guiding switching method 300 according to a third embodiment of the present disclosure. The magnet-guiding switching method 300 includes a route planning step 310, a switching controlling step 320 and a guiding step 330. The details of the magnet-guiding switching method 300 will be described with the magnet-guiding switching system 100 of FIGS. 1 and 2.

In the route planning step 310, a route controlling center 130 plans a driving route of a vehicle 200 according to an environment situation and sends a driving signal S1 to a switching controlling unit 121 of a switching controlling module 120.

In the switching controlling step 320, the switching controlling unit 121 informs a magnetic field switching unit 122 of the switching controlling module 120 to turn on a plurality of first switching electromagnets 113 at a first route R1 and to turn off a plurality of second switching electromagnets 114 at a second route R2, or to turn on the second switching electromagnets 114 and to turn off the first switching electromagnets 113.

In the guiding step 330, the vehicle 200 is guided by magnetic fields of the first switching electromagnets 113 that are turned on or magnetic fields of the second switching electromagnets 114 that are turned on to decide to continuously drive on the first route R1 or to switch to the second route R2.

Therefore, the driving route planed by the route controlling center 130 can be sent to the switching controlling module 120, and the switching controlling module 120 controls turning on the first switching electromagnets 113 or the second switching electromagnets 114 to guide the vehicle 200 to continuously drive on the first route R1 (going straight) or to switch to the second route R2 (turning).

Hence, in the route planning step 310, the route planning module 132 of the route controlling center 130 can plan the driving route of the vehicle 200 according to the road situation or the demands. Moreover, in the route planning step 310, the route controlling center 130 sends the driving signal S1 to a decision controlling module 210 of the vehicle 200, and the decision controlling module 210 of the vehicle 200 sends a confirming signal to the switching controlling unit 121, thereby ensuring the identified driving route is the same.

Furthermore, in the guiding step 330, a magnetic positioning unit 223 of the vehicle 200 is configured to detect the magnetic fields of the first switching electromagnets 113 and the second switching electromagnets 114, and a track modifying unit 212 of the decision controlling module 210 modifies a driving track of the vehicle 200 according to at least one parameter of the vehicle 200 and the magnetic fields detected by the magnetic positioning unit 223. Precisely, the track modifying unit 212 may decide a turning starting time of the vehicle 200 according to the at least one parameter of the vehicle 200 and the magnetic fields detected by the magnetic positioning unit 223. As mentioned above, since the parameter of the vehicle 200 may be the weight, the length, the wheel axle length, and the current speed, and the parameters will affect the turning radius, with the track modifying unit 212 to modify the driving track of the vehicle 200, the safety can be increased.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure covers modifications and variations of this disclosure provided they fall within the scope of the following claims.

What is claimed is:

1. A magnet-guiding switching system, comprising:
a lane magnetic field device, comprising:
   a plurality of first permanent magnets arranged at a first section and a second section of a first route in intervals, wherein the first route further comprises a guiding section located between the first section and the second section;
   a plurality of second permanent magnets arranged at a continuous section of a second route in intervals, wherein the second route further comprises a switching section connected to the continuous section of the second route and the first section of the first route, and the continuous section of the second route and the second section of the first route are not coaxial;
   a plurality of first switching electromagnets arranged at the guiding section in intervals; and
   a plurality of second switching electromagnets arranged at the switching section in intervals;
a switching controlling module, comprising:
   a magnetic field switching unit electrically connected to the first switching electromagnets and the second switching electromagnets, the magnetic field switching unit being configured to turn on or turn off the first switching electromagnets and the second switching electromagnets; and
   a switching controlling unit signally connected to the magnetic field switching unit to send a switching controlling signal to the magnetic field switching unit; and
a route controlling center communicatively connected to the switching controlling unit, the route controlling center being configured to plan a driving route of a vehicle and to send a driving signal to the switching controlling unit;
wherein as the switching controlling unit informs the magnetic field switching unit to turn on the first switching electromagnets and to turn off the second switching electromagnets according to the driving signal, the vehicle is guided by magnetic fields of the first switching electromagnets to drive from the first section of the first route to the second section along the guiding section; as the switching controlling unit informs the magnetic field switching unit to turn on the second switching electromagnets and to turn off the first switching electromagnets according to the driving signal, the vehicle is guided by magnetic fields of the second switching electromagnets to drive from the first section of the first route to the continuous section of the second route along the switching section;
wherein the vehicle comprises a decision controlling module and a magnetic positioning unit configured to detect the magnetic fields of the first switching electromagnets and the second switching electromagnets, the decision controlling module comprises a track modifying unit, the track modifying unit modifies a turning angle of the vehicle and decides a turning starting time of the vehicle according to the magnetic fields detected by the magnetic positioning unit and parameters that affect a turning radius of the vehicle including a weight, a length, a wheel axle length and a current speed of the vehicle.

2. The magnet-guiding switching system of claim 1, wherein the decision controlling module further comprises an on board unit communicatively connected to the route controlling center and the switching controlling unit.

3. The magnet-guiding switching system of claim 1, wherein each of the intervals between two of the first switching electromagnets is larger than 50 cm and smaller than 120 cm.

4. The magnet-guiding switching system of claim 1, wherein a center radius of curvature of the switching section is represented as r, a number of the second switching electromagnets is equal to $\pi \cdot r/2$, and $\pi$ represents a ratio of a circumference of a circle.

5. The magnet-guiding switching system of claim 1, wherein the vehicle comprises a sensing module, and the sensing module comprises a camera, a radar and a lidar.

6. The magnet-guiding switching system of claim 5, wherein the vehicle further comprises a positioning module, and the positioning module comprises:
a real time dynamic positioning unit configured to conduct a satellite positioning; and
a simultaneous localization-and-mapping unit signally connected to the sensing module and configured to receive detections of the sensing module to conduct a positioning in a self-environment.

7. The magnet-guiding switching system of claim 1, wherein the vehicle comprises a vehicle controlling module, and the vehicle controlling module comprises a steering wheel, a gas valve and a braking unit.

8. A magnet-guiding switching method, comprising:
a route planning step, wherein a route controlling center plans a driving route of a vehicle according to an environment situation and sends a driving signal to a switching controlling unit of a switching controlling module;
a switching controlling step, wherein the switching controlling unit informs a magnetic field switching unit of the switching controlling module to turn on a plurality of first switching electromagnets at a first route and to turn off a plurality of second switching electromagnets at a second route, or to turn on the second switching electromagnets and to turn off the first switching electromagnets; and
a guiding step, wherein the vehicle is guided by magnetic fields of the first switching electromagnets that are turned on or magnetic fields of the second switching electromagnets that are turned on to decide to continuously drive on the first route or to switch to the second route, wherein a magnetic positioning unit of the vehicle detects the magnetic fields of the first switching electromagnets and the second switching electromagnets, a track modifying unit of a decision controlling module of the vehicle modifies a turning angle of the vehicle and decides a turning starting time of the vehicle according to the magnetic fields detected by the magnetic positioning unit and parameters that affect a turning radius of the vehicle including a weight, a length, a wheel axle length and a current speed of the vehicle.

9. The magnet-guiding switching method of claim 8, wherein in the route planning step, the route controlling center sends the driving signal to the decision controlling module of the vehicle, and the decision controlling module of the vehicle sends a confirming signal to the switching controlling unit.

\* \* \* \* \*